United States Patent
Silver et al.

(10) Patent No.: US 7,543,735 B2
(45) Date of Patent: *Jun. 9, 2009

(54) SYSTEM AND METHOD FOR PROCESSING PACKAGE DELIVERY

(75) Inventors: Edward Michael Silver, Atlanta, GA (US); Linda Ann Roberts, Decatur, GA (US); Hong Thi Nguyen, Atlanta, GA (US); Samuel N. Zellner, Dunwoody, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 534 days.

This patent is subject to a terminal disclaimer.

(21) Appl. No.: 11/057,465

(22) Filed: Feb. 14, 2005

(65) Prior Publication Data

US 2005/0218220 A1   Oct. 6, 2005

Related U.S. Application Data

(60) Continuation-in-part of application No. 10/392,516, filed on Mar. 20, 2003, now Pat. No. 6,892,939, which is a division of application No. 10/052,110, filed on Jan. 17, 2002, now abandoned.

(51) Int. Cl.
*G06F 17/00* (2006.01)
*G06F 7/00* (2006.01)
*G06F 19/00* (2006.01)
*G06Q 30/00* (2006.01)
*G06Q 90/00* (2006.01)

(52) U.S. Cl. .................. 235/375; 235/385; 235/376
(58) Field of Classification Search .............. 209/584; 700/115, 213, 225, 226; 235/375, 376, 385; 705/1, 401, 405, 406, 407, 60, 28
See application file for complete search history.

(56) References Cited

U.S. PATENT DOCUMENTS 4,972,494 A    11/1990   White et al. ................... 382/8

(Continued)

FOREIGN PATENT DOCUMENTS

JP    11-76946    3/1999

(Continued)

*Primary Examiner*—Daniel Walsh
(74) *Attorney, Agent, or Firm*—Myers Bigel Sibley & Sajovec

(57) ABSTRACT

A method for processing packages is provided. A package is received at an intermediate shipping site and a delivery authorization status corresponding to the package is determined based on a threshold of some characteristic of the package. The package is delivered if the authorization status is that delivery is acceptable and the package is not delivered if the authorization status is that delivery is not acceptable. The acceptability of the package for delivery is determined by a response that an addressee provides to an electronic message notification of package availability. The electronic response preferably contains some authenticating information regarding the package.

20 Claims, 10 Drawing Sheets

U.S. PATENT DOCUMENTS

| | | | | |
|---|---|---|---|---|
| 5,079,714 | A * | 1/1992 | Manduley et al. | 700/219 |
| 5,119,306 | A * | 6/1992 | Metelits et al. | 705/406 |
| 5,535,127 | A | 7/1996 | Uno et al. | 364/464.02 |
| 5,831,860 | A * | 11/1998 | Foladare et al. | 700/219 |
| 5,944,787 | A | 8/1999 | Zoken | 709/206 |
| 6,006,211 | A * | 12/1999 | Sansone et al. | 705/410 |
| 6,021,942 | A | 2/2000 | Monico | 235/375 |
| 6,032,138 | A | 2/2000 | McFiggans et al. | 705/410 |
| 6,035,104 | A | 3/2000 | Zahariev | 395/200.33 |
| 6,064,995 | A | 5/2000 | Sansone et al. | 705/410 |
| 6,128,739 | A | 10/2000 | Fleming, III | 713/200 |
| 6,275,745 | B1 | 8/2001 | Critelli et al. | 700/227 |
| 6,304,897 | B1 | 10/2001 | Venkatraman et al. | 709/206 |
| 6,311,892 | B1 | 11/2001 | O'Callaghan et al. | 235/375 |
| 6,385,504 | B1 * | 5/2002 | Pintsov et al. | 700/226 |
| 6,394,278 | B1 | 5/2002 | Reed | 209/44.4 |
| 6,409,082 | B1 | 6/2002 | Davis et al. | 235/385 |
| 6,508,365 | B1 | 1/2003 | Cacace-Bailey et al. | 209/584 |
| 6,539,360 | B1 * | 3/2003 | Kadaba | 705/28 |
| 6,707,381 | B1 | 3/2004 | Maloney | 340/568.1 |
| 6,892,939 | B2 * | 5/2005 | Silver et al. | 235/375 |
| 7,313,460 | B1 * | 12/2007 | Prater et al. | 700/213 |
| 2002/0016726 | A1 * | 2/2002 | Ross | 705/7 |
| 2002/0032573 | A1 * | 3/2002 | Williams et al. | 705/1 |
| 2002/0120668 | A1 * | 8/2002 | Pintsov et al. | 709/200 |
| 2002/0143880 | A1 * | 10/2002 | Sansone et al. | 709/206 |
| 2002/0165729 | A1 * | 11/2002 | Kuebert et al. | 705/1 |
| 2003/0034874 | A1 * | 2/2003 | Mann | 340/5.3 |
| 2003/0084007 | A1 | 5/2003 | Brookner | 705/408 |
| 2003/0132296 | A1 * | 7/2003 | Silver et al. | 232/385 |
| 2003/0155414 | A1 * | 8/2003 | Silver et al. | 235/375 |
| 2003/0171843 | A1 | 9/2003 | Okamura | 700/213 |
| 2003/0236847 | A1 * | 12/2003 | Benowitz et al. | 709/206 |
| 2004/0112950 | A1 * | 6/2004 | Manduley et al. | 235/375 |
| 2004/0211834 | A1 * | 10/2004 | Fleckenstein et al. | 235/385 |
| 2005/0218220 | A1 * | 10/2005 | Silver et al. | 235/384 |
| 2005/0251431 | A1 * | 11/2005 | Schmidtberg | 705/6 |
| 2007/0073551 | A1 * | 3/2007 | Williams et al. | 705/1 |
| 2007/0073552 | A1 * | 3/2007 | Hileman | 705/1 |
| 2007/0129957 | A1 * | 6/2007 | Elliott et al. | 705/1 |

FOREIGN PATENT DOCUMENTS

JP 11-253 891 A 9/1999

* cited by examiner

SYSTEM AND METHOD FOR PROCESSING PACKAGE DELIVERY

CROSS REFERENCE TO RELATED APPLICATIONS

This application is a continuation in part application of U.S. patent application Ser. No. 10/392,516, filed Mar. 20, 2003, entitled "System and Method for Processing Package Delivery" which is a divisional application of U.S. patent application Ser. No. 10/052,110, filed Jan. 17, 2002, bearing the same title, now abandoned. The disclosure of the above-referenced U.S. patent applications are incorporated herein by reference in their entirety.

FIELD OF THE INVENTION

The invention generally relates to the field of package delivery. More particularly, the invention relates to systems and methods for processing package delivery and includes computer implemented systems and methods.

BACKGROUND OF THE INVENTION

Recent events, such as the mailing of anthrax to government officials and news agencies, have heightened many people's concerns about the safety of package delivery. Nevertheless, people often depend on package delivery to receive purchases, correspondence, and the like. Further, package delivery has increased over time and may continue to increase with increasing on-line shopping via the Internet. As such, it appears that package delivery will continue to be an important way for people to receive purchases, correspondence, and the like. There is not presently available a system for determining whether a package is expected and therefore legitimate, or whether a package has arrived unexpectedly from an unrecognized source and therefore may be for illegitimate purposes.

In view of the foregoing, there is a need for a system and method for authorizing package delivery.

SUMMARY OF THE INVENTION

The invention is directed to determining a package delivery authorization status and conditioning package delivery on the state of the delivery authorization status.

A method for processing packages is provided. A package is received at an intermediate shipping site and a delivery authorization status corresponding to the package is determined. The package is delivered if the authorization status is that delivery is acceptable and the package is not delivered if the authorization status is that delivery is not acceptable.

Delivery authorization is determined by receiving information identifying the received package and receiving information identifying an expected package. The information identifying the expected package is compared to the information identifying the received package. The package is designated for delivery if the information identifying the expected package matches the information identifying the received package. The package may be designating for non-delivery if the information identifying the expected package does not match the information identifying the received package.

The information may comprise at least one of the following: an identification of the sender of the package, the addressee of the package, an identification of the package, and a projected date of delivery. The information may be received via an e-mail message, a bar code scanner, and the like. An e-mail message may be received from a sender of the package or an addressee of the package.

Delivery authorization may also be determined based on a list of predefined senders. The package sender is determined and compared to a plurality of predefined pre-approved senders. The delivery authorization status is designated as delivery is acceptable if the determined package sender matches one of the plurality of predefined senders and designated as delivery is not acceptable if the determined package sender does not match any of the plurality of predefined pre-approved senders.

Delivery authorization may also be determined based on two e-mail messages, one from the package sender and one from the package addressee. A first e-mail message is received from a sender of the package and a second e-mail message is received from an addressee of the package. From the first e-mail message, at least one of the following is determined: an identification of the sender of the package, an identification of the addressee of the package, an identification of the package, and a projected delivery date of the package. From the second e-mail message, at least one of the following is determined: an identification of the sender of the package, an identification of the addressee of the package, and an identification of the package. A delivery authorization status is also determined from the second e-mail message. The package is designated for delivery if the information determined from the first e-mail message matches the information determined from the second e-mail message and if the delivery authorization status determined from the second e-mail message is delivery is acceptable.

In one embodiment, a received package has package information readable at an intermediate site. The information may be read using an RF tag reader or other reading means. Characteristics of the package are determined from the package information and checked against a threshold to determine if a delivery authorization is required. If an authorization is required, an electronic message is sent to the addressee informing her of the pending delivery. The addressee responds via an electronic message and authorizes package delivery by providing one or more of the characteristics of the package. Once authorization is given the package may be delivered to the addressee from the intermediate site.

The above-listed features, as well as other features, of the invention will be more fully set forth hereinafter.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings, and wherein.

DETAILED DESCRIPTION OF ILLUSTRATIVE EMBODIMENTS

Figure 1:
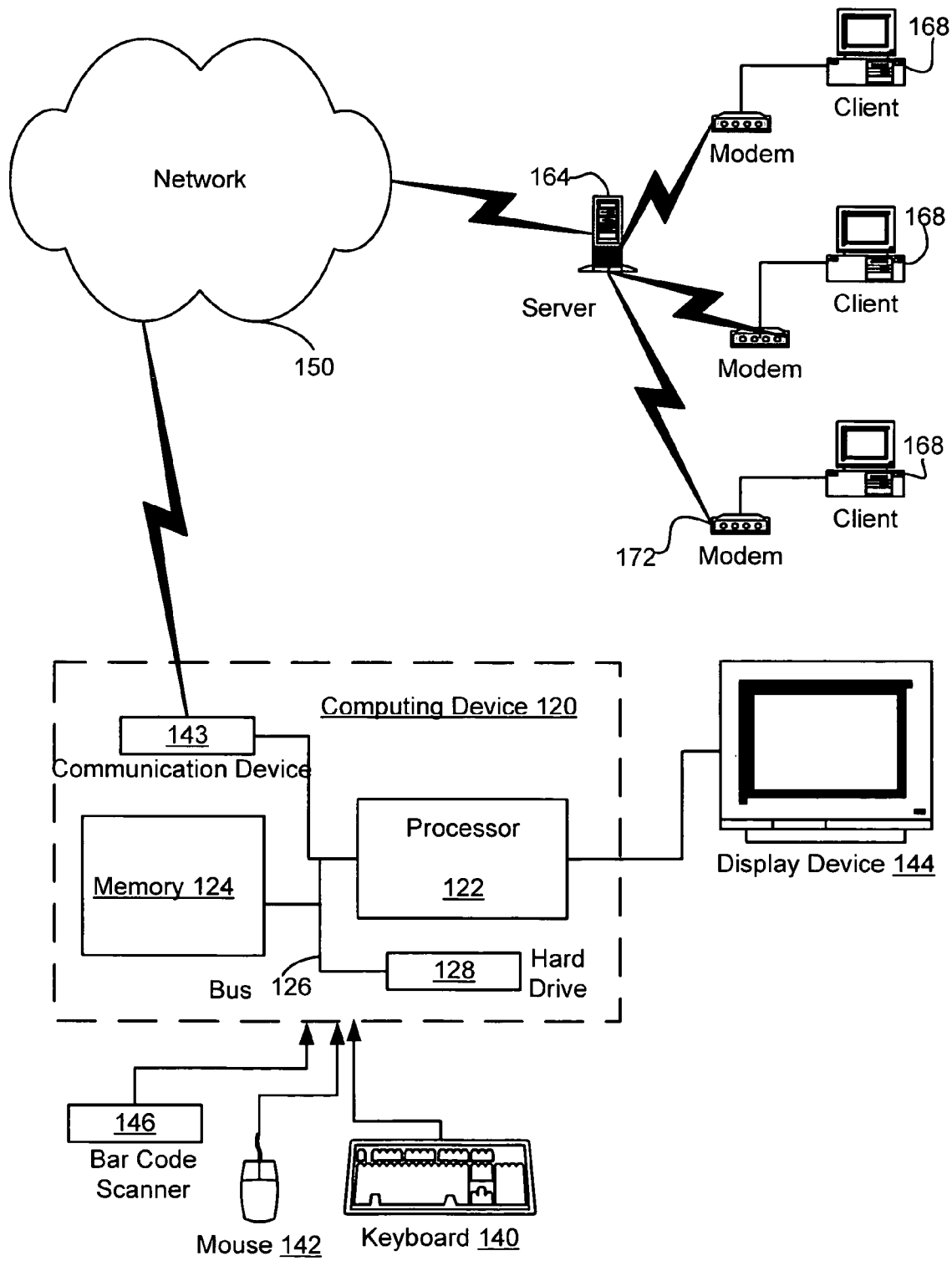
FIG. 1 is a diagram of an exemplary computing device and communications network with which the invention may be employed.

FIG. 1 is a diagram of a generic computing system with which the invention may be employed. As shown in FIG. 1, computing device 120 includes processor 122, system memory 124, and system bus 126 that couples various system components including system memory 124 to processor 122. System memory 124 may include read-only memory (ROM) and/or random access memory (RAM). Computing device 120 may further include hard-drive 128, which provides storage for computer readable instructions, data structures, program modules, data, and the like. A user (not shown) may enter commands and information into the computing device 120 through input devices such as a keyboard 140, a mouse 142, and a bar code scanner 146. Display device 144 may also include other devices such as a touch screen, a light pen, a grid of light beams, or the like for inputting information into processor 122. A display device 144, such as a monitor, a flat panel display, or the like is also connected to the computing device 120 for output. Communications device 143, which in one embodiment is a modem, provides for communications over network 150. Processor 122 can be programmed with instructions to interact with other computing systems so as to perform the methods described below. The instructions may be received from network 150 or stored in memory 124 and/or hard drive 128. Processor 122 may be loaded with any one of several computer operating systems such as WINDOWS NT operating system, WINDOWS 2000 operating system, LINUX operating system, and the like.

As shown in FIG. 1, computing device 120 may be connected to computer network 150. Server 164 is operable to communicate with other computing devices over network 150. Network 150 may be the Internet, a local area network, a wide area network, or the like. Server 164 may communicate e-mails, web pages, and other data. Server 164 may be operated by an ISP, a corporate computer department, or any other organization or person with a server connected to network 150. Server 164 is accessible by client stations 168 from which users may send and receive data and browse web pages. Client stations 168 may connect to servers via a local area network (not shown) or using a remote connection device 172 such as, for example, a modem, as is shown in connection with server 164.

Figure 2:
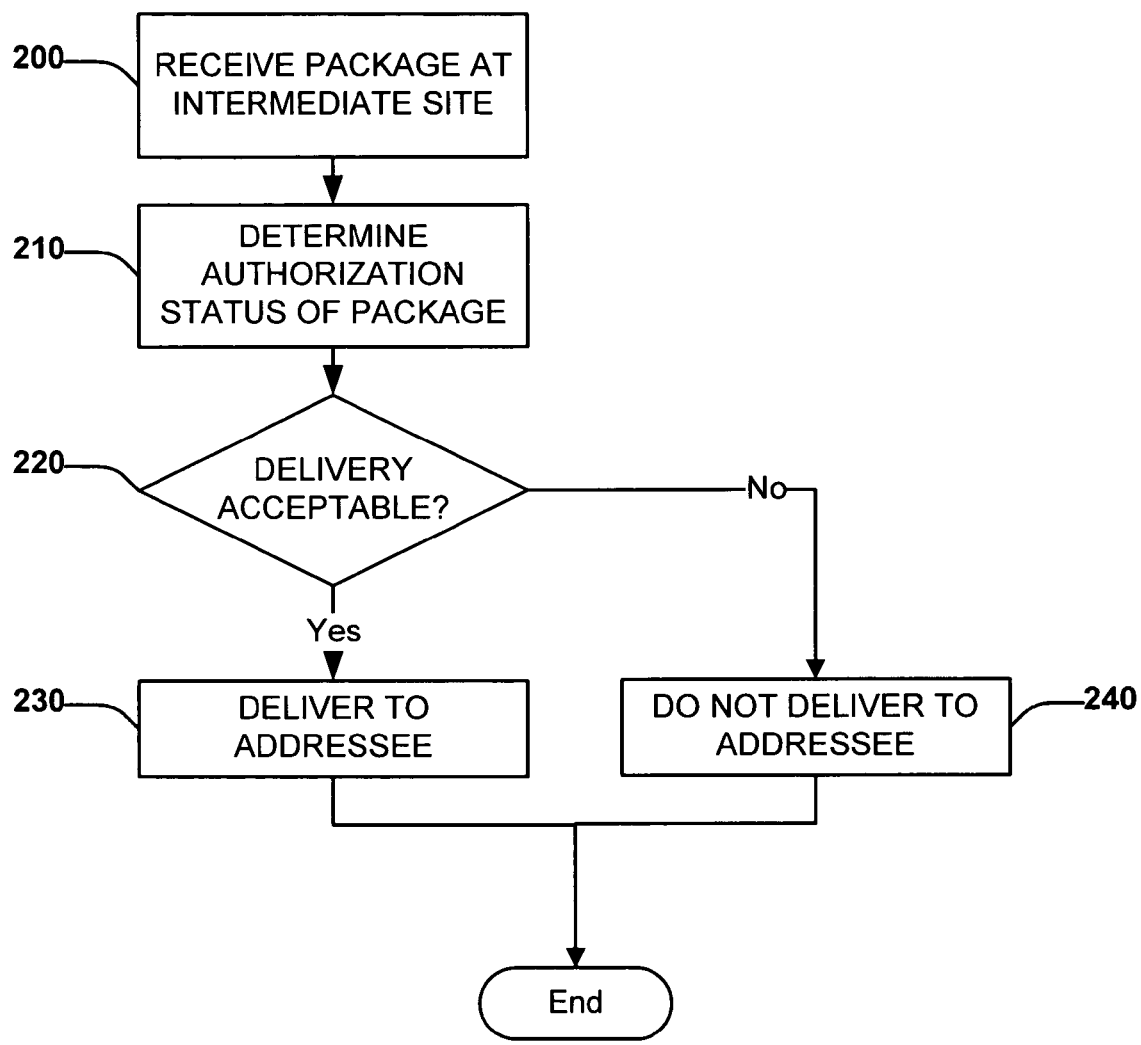
FIG. 2 is a flow diagram of an illustrative method for processing packages, in accordance with an embodiment of the invention.

The computing system described above may be used to implement an illustrative method for authorizing package delivery, such as the illustrative method of FIG. 2. The method may be implemented for any type of package delivery, such as, for example, a book, a computer, a letter, or the like. The delivery may be made by any carrier, such as for example, the United States Post Office, Federal Express, United Parcel Service, a trucking company, and the like.

At step 200, a package, which may be for example, a package containing a book that was requested to be delivered to a business address, is received at an intermediate site or a clearinghouse. In this illustrative example, the package is received at a mail room at the employee's business address. The package, however, may be received at any intermediate site, such as for example, a local post office, a local distribution site, a quarantined site, or the like. The intermediate site may be a secure site at a remote location. Typically, the intermediate site includes a computing device to maintain package authorization statuses.

At step 210, a delivery authorization status corresponding to the received package is determined. The delivery authorization status identifies whether or not the package is to be delivered to the addressee. The delivery authorization status may indicate that the package is an expected package or that the package comes from a trusted source. The delivery authorization status may be determined, for example, using methods such as those described below in connection with FIGS. 3, 5, 7, and 8.

At step 220, it is determined whether or not the delivery authorization status indicates that package delivery is acceptable. If the delivery authorization status indicates that delivery is acceptable, then the method proceeds to step 230, wherein the package is delivered from the intermediate location, such as the mail room, to the employee that purchased the book. If the delivery authorization status indicates that delivery is not acceptable, then the method proceeds to step 240. At step 240, the package is not delivered from the mail room to the employee; rather, the package may be returned to the sender, held until receiving an authorization status that delivery is acceptable, quarantined, receive further security checks, be discarded, or the like. In this manner, an addressee does not receive a package unless there is some authorization of package delivery, thereby increasing the security of package delivery. Instead, the package is held at an intermediate site (which may be a secure location, for example) where the package may be appropriately handled.

Figure 3:
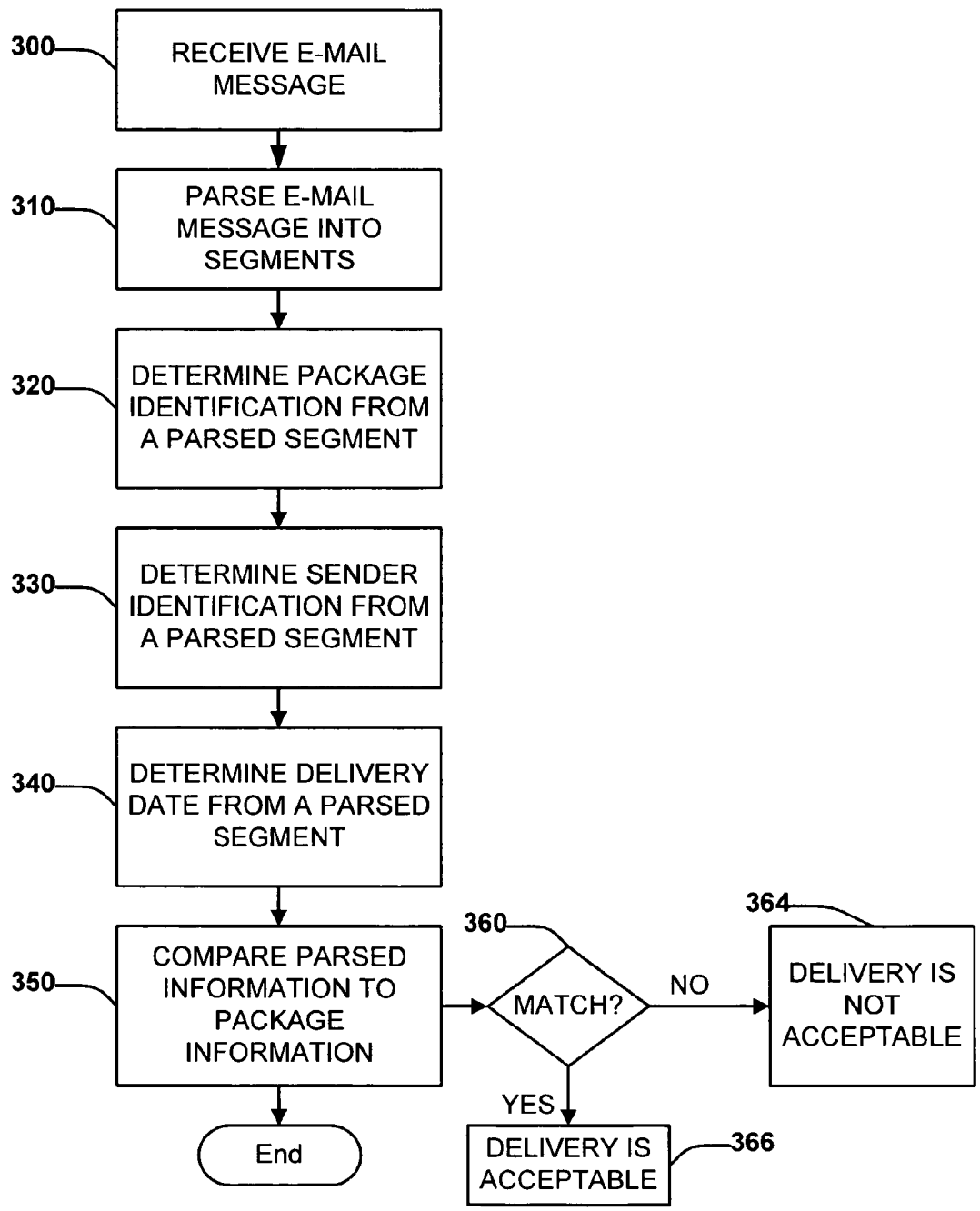
FIG. 3 is a flow diagram of an illustrative method for determining whether package delivery is authorized, in accordance with an embodiment of the invention.

Determining delivery authorization status, as shown in step 210, may be implemented in a variety of ways. FIG. 3 illustrates one embodiment of the invention, in which package delivery authorization status is determined from an e-mail message. The embodiment illustrated in FIG. 3 may be implemented on computing device 120 of FIG. 1 and will be described as such, however, the invention may be implemented on any computing system. The following illustration contemplates Benjamin Scott ordering a book entitled "American History Textbook" from Barnes and Noble wherein the book is projected to be delivered on Aug. 15, 2001.

As shown in FIG. 3, at step 300, computing device 120 receives an e-mail message from network 150. The e-mail message may be received from the package sender, which for purposes of illustration is Barnes and Noble. Alternatively, the e-mail message may be received from the package addressee, which for the purposes of illustration is Benjamin Scott. In this embodiment, the e-mail message itself serves as an authorization for package delivery. To determine which package has been authorized for delivery, the contents of the e-mail message are used, as described in more detail below.

At step 310, processor 122 parses the e-mail message into segments. The e-mail message may be formatted into segments by the e-mail sender (i.e., the package sender or the package addressee). For example, the e-mail message may be formatted into a first segment storing an identification of the sender of the package, a second segment storing an identification of the addressee of the package, a third segment storing an identification of the package, and a fourth segment storing a projected delivery date of the package. The identification of the package may be a description of the contents of the package, an identification number, or the like. The projected delivery date may also be a range of dates. The segments may be separated with commas, line returns, or the like to facilitate parsing.

Further, an application may be implemented on client 168 to create the proper e-mail format. For example, the application may display a pop-up window storing fields for an identification of the sender of the package, an identification of the addressee of the package, an identification of the package, and a projected delivery date of the package. Upon receiving information in each of the fields, the application may format the information as an e-mail message having the information in proper segments and with proper separation between segments.

At step 320, processor 122 determines package identification information from one of the parsed segments. In this illustrative example, the parsed segment corresponding to package identification contains "American History Textbook" and therefore, processor 122 determines the package identification to be "American History Textbook."

At step 330, processor 122 determines sender identification information from one of the parsed segments. In this illustrative example, the parsed segment corresponding to sender identification contains "Barnes and Noble" and therefore, processor 122 determines the sender identification to be "Barnes and Noble."

At step 340, processor 122 determines a projected delivery date from one of the parsed segments. In this illustrative example, the parsed segment corresponding to a projected delivery date contains "Aug. 15, 2001" and therefore, processor 122 determines the projected delivery date to be "Aug. 15, 2001."

At step 350, the delivery authorization status of the received package is determined by comparing information from the received package (i.e., package information) to information parsed from the e-mail message. Package information comprises information contained on the received package, such as for example, information on the shipping label, the packing list, and the like. Package information also comprises the actual delivery date of the package. Package information may be received by computing system 120 via bar code scanner 146, keyboard 140, mouse 142, or the like.

If the package information matches the parsed information, then the delivery authorization status of the received package is determined to be that delivery is acceptable, as shown in steps 360 and 366. If the package information does not match the parsed information from any e-mail message, then the delivery authorization status of the received package is determined to be that delivery is not acceptable, as shown in steps 360 and 364. While the illustrative example of FIG. 3 shows information parsed from a single e-mail, it is contemplated that a typical implementation of the invention involves multiple e-mails and comparing of package information to information parsed from each of the multiple e-mails, or until a match is determined.

Figure 4:
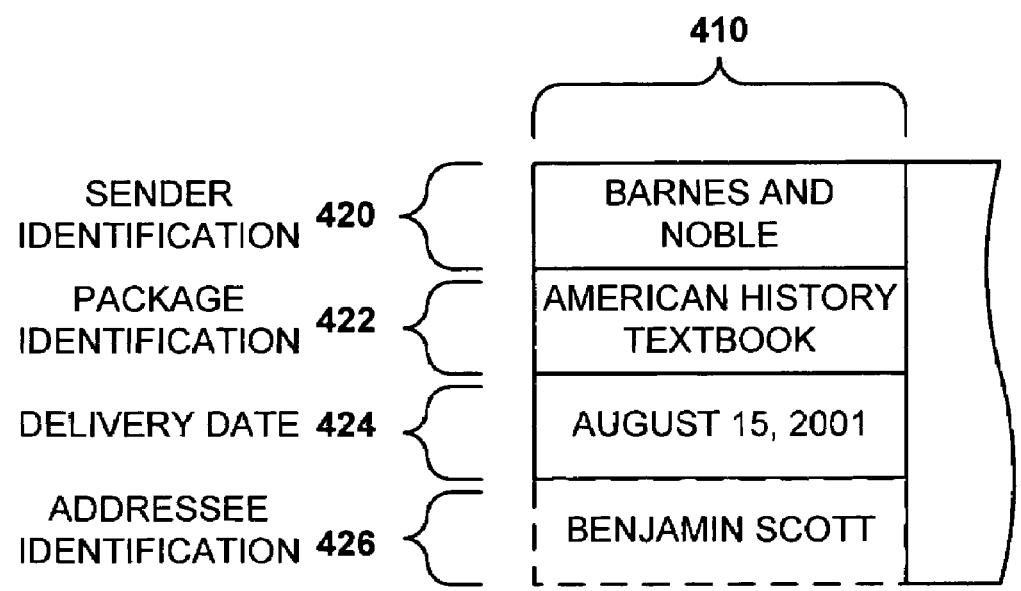
FIG. 4 is a diagram of an illustrative data table for storing an authorization status as determined in the method of FIG. 3.

To facilitate determining delivery authorization status, the parsed information may be stored in a data table for comparison against package information. FIG. 4 is a diagram of an illustrative data table 400 for storing parsed information. While a data table is illustrated, such information may be stored in a spreadsheet, a database, or the like. The data table may reside in memory 124, hard-drive 128, across network 150, or the like.

Data table 400 comprises a record for each e-mail message. Each record comprises a plurality of fields for storing information parsed from the e-mail message. As shown in FIG. 4, record 410 comprises a first field 420 for storing a sender identification, a second field 422 for storing a package identification, a third field 424 for storing a projected delivery date, and a fourth field 426 for storing an addressee identification. As shown, first field 420 contains a sender identification of "Barnes and Noble," second field 422 contains a package identification of "American History Textbook," third field 424 contains a projected delivery date of "Aug. 15, 2001," and fourth field 426 contains an addressee identification of "Benjamin Scott." With such a data table, package information can be compared against multiple records of parsed information to determine a delivery authorization status.

While the embodiment illustrated in FIGS. 3 and 4 can use a single e-mail message to determine a delivery authorization status, other techniques can be used to determine a delivery authorization status. For example, the embodiment illustrated in FIG. 5 uses an e-mail message and a list of pre-approved senders to determine a delivery authorization status.

Figure 5:
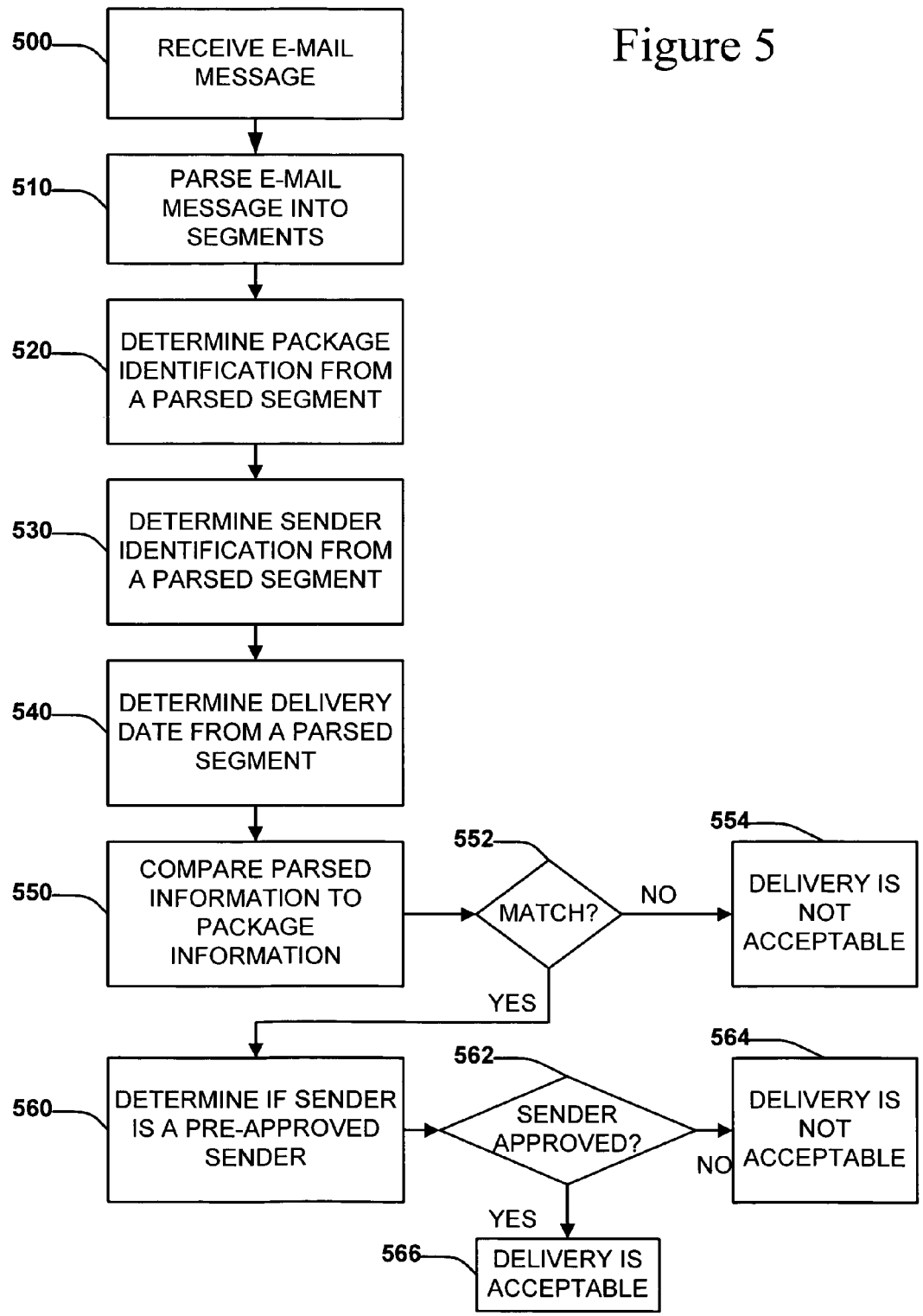
FIG. 5 is a flow diagram of another method for determining whether package delivery is authorized, in accordance with another embodiment of the invention.

As shown in FIG. 5, at step 500, computing device 120 receives an e-mail message from network 150. The e-mail message may be received from the package sender or the package addressee.

At step 510, processor 122 parses the e-mail message into segments. At step 520, processor 122 determines a package identification from one of the parsed segments. At step 530, processor 122 determines a sender identification from one of the parsed segments. At step 540, processor 122 determines a projected delivery date from one of the parsed segments.

At step 550, processor 122 compares parsed information to package information to determine a matching record, similar to that discussed above in connection with step 350. If the received package information does not match the parsed information from any record, then the delivery authorization status is determined as delivery is not acceptable, as shown in steps 552 and 554.

At step 560, processor 122 compares the sender identification of the matching record to a list of pre-approved senders to determine a delivery authorization status of the received package. If the sender identification matches one of the pre-approved senders, then the delivery authorization status of the received package is determined to be that delivery is acceptable, as shown in steps 562 and 566. If the sender identification does not match any of the pre-approved senders, then the delivery authorization status is determined to be that delivery is not acceptable, as shown in steps 562 and 564.

Figure 6:
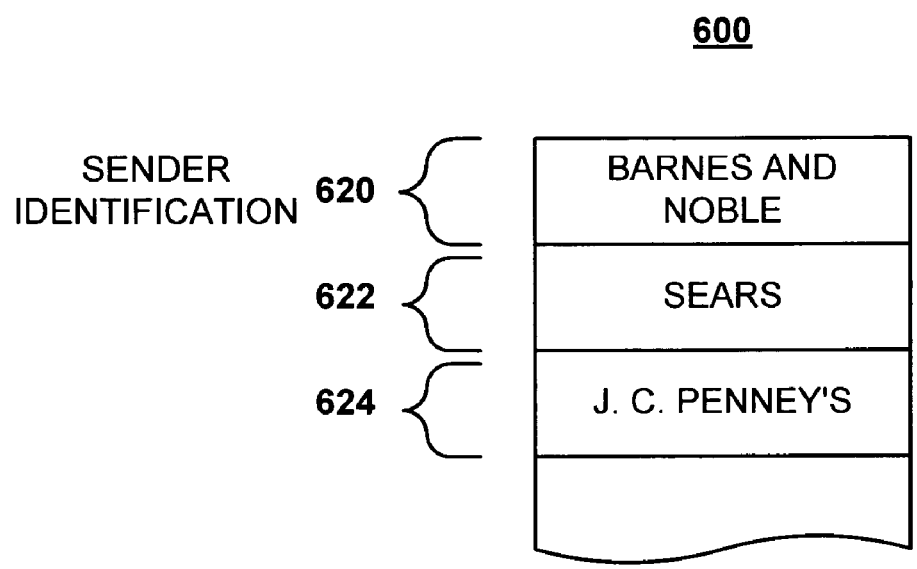
FIG. 6 is a diagram of an illustrative data table for storing a plurality of predefined sender identifications to determine whether package delivery is authorized in accordance with the method of FIG. 5.

Pre-approved sender information may be predefined and stored in a data table for comparison against package information and/or information parsed from an e-mail message. FIG. 6 is a diagram of an illustrative data table 600 for storing pre-approved senders. While a data table is illustrated, such pre-approved sender information may be stored in a spreadsheet, a database, or the like. The data table may reside in memory 124, hard-drive 128, across network 150, or the like.

Data table 600 comprises a field for storing an indication of each pre-approved sender. As shown in FIG. 6, first field 620 contains "Barnes and Noble", second field 622 contains "Sears", and third field 624 contains "J.C. Penney's." With such a data table, package information and/or parsed information can be compared against a list of pre-approved senders to determine a delivery authorization status.

Figure 7:
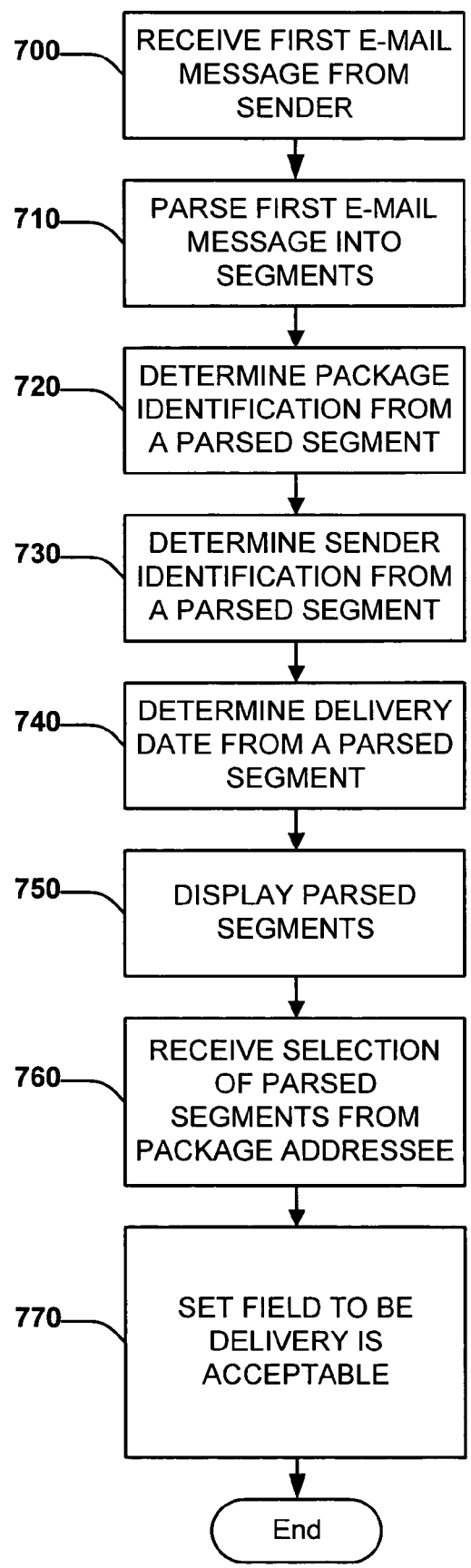
FIG. 7 is a flow diagram of another illustrative method for determining whether package delivery is authorized, in accordance with another embodiment of the invention.

Other methods can be used to facilitate package delivery by non-pre-approved senders such as the illustrative method of FIG. 7 that determines package delivery authorization status using messages from both a package sender and a package addressee. This method can be implemented in addition to or in place of the method described in connection with FIG. 5.

As shown in FIG. 7, at step 700, computing device 120 receives an e-mail message from the package sender via network 150. At step 710, processor 122 parses the e-mail message into segments. At step 720, processor 122 determines a package identification from one of the parsed segments. At step 730, processor 122 determines a sender identification from one of the parsed segments. At step 740, processor 122 determines a projected delivery date from one of the parsed segments.

At step 750, processor 122 displays information from the parsed message segments to the addressee. For example, processor 122 may read parsed information from the records of data table 400 and display the information on display device 144 or on client 168 over network 150 such that the package addressee can select one of the records for authorization of package delivery. The displayed records may be limited to those records that are still pending a delivery. A package addressee may select a record via mouse 142, keyboard 140, or the like.

At step 760, processor 122 receives a selection of one of the records from the package addressee, which is interpreted by processor 122 as an authorization for package delivery.

At step 770, processor 122 designates the delivery authorization status corresponding to the received selected record as delivery is acceptable. In this manner, a package addressee may authorize package delivery using a local area network rather than e-mail. Such an interface may be simpler to use than an e-mail interface and may provide increased security. Further, the addressee selects the record corresponding to the authorization, thereby relieving processor 122 from determining a matching record.

Figure 8:
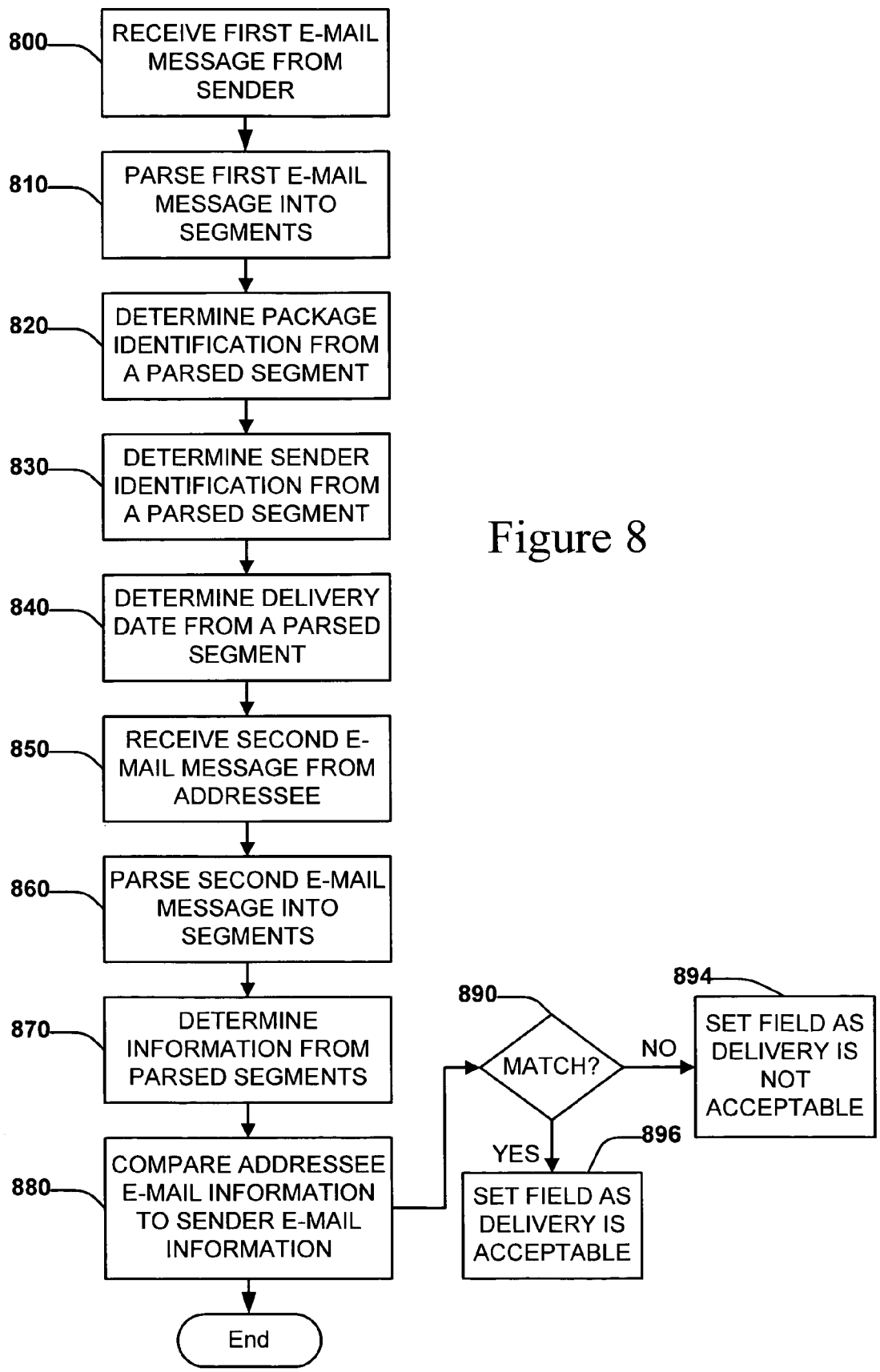
FIG. 8 is a flow diagram of yet another illustrative method for determining whether package delivery is authorized, in accordance with another embodiment of the invention.

Alternatively, the authorization may be received from the addressee in the form of an e-mail message. A method for such a receipt of authorization is shown in FIG. 8. At step 800, computing device 120 receives an e-mail message from the package sender. At step 810, processor 122 parses the e-mail message into segments. At step 820, processor 122 determines a package identification from one of the parsed segments. At step 830, processor 122 determines a sender identification from one of the parsed segments. At step 840, processor 122 determines a projected delivery date from one of the parsed segments.

At step 850, processor 122 receives a second e-mail message, the second e-mail message originating from the package addressee. At step 860, processor 122 parses the second e-mail message into segments. At step 870, processor 122 determines information from the parsed segments similar to that described in steps 720, 730 and 740. This information is used to match the addressee e-mail message to a sender e-mail message.

At step 880, processor 122 compares the information determined in step 870 from the second e-mail message to information determined in steps 820, 830, and 840 from the first e-mail message. If the information from the first e-mail matches the information from the second e-mail, then the delivery authorization status of the record corresponding to the first e-mail is designated as delivery is acceptable, as shown in steps 860 and 866. The delivery authorization status can be stored in a data table, as described in more detail below. If the package information does not match the parsed information from any e-mail message, then the delivery authorization status of the record corresponding to the first e-mail package is designated as delivery is not acceptable, as shown in steps 860 and 864.

Figure 9:
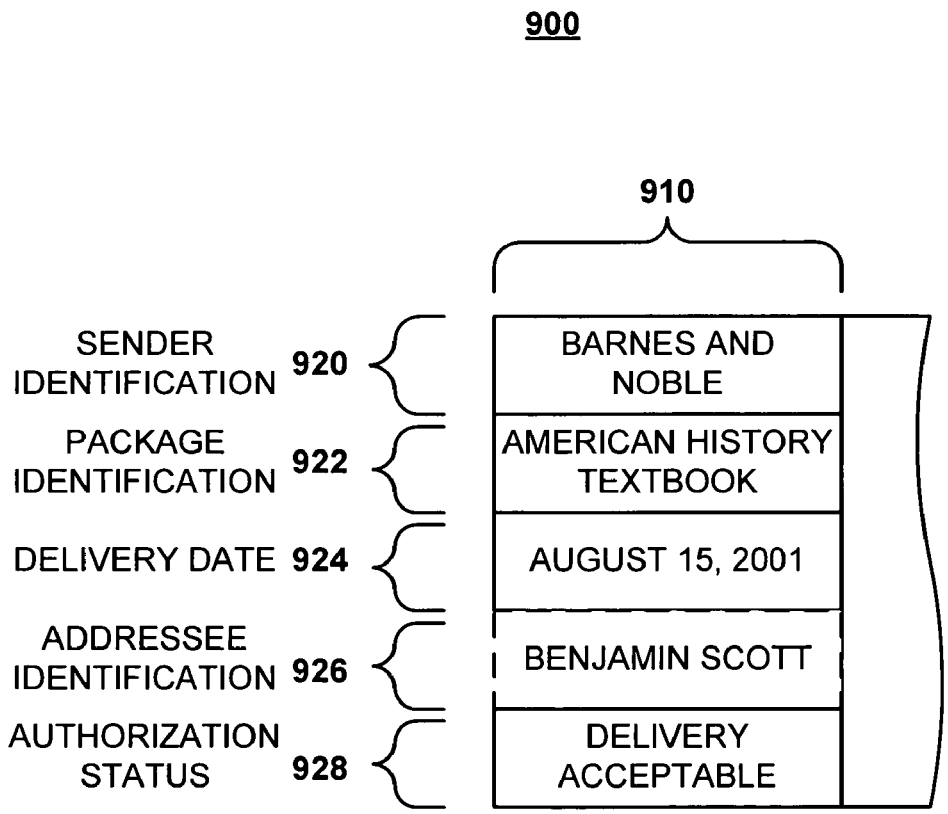
FIG. 9 is a diagram of an illustrative data table for storing an authorization status as determined in accordance with the method of FIG. 7 or FIG. 8.

Delivery authorization statuses determined from e-mail messages and/or local area networks (such as described in FIGS. 7 and 8) may be stored in a data table for later comparison against package information. FIG. 9 is a diagram of an illustrative data table 900 for storing such a delivery authorization status. Data table 900 comprises a record for each e-mail message from a sender. Each record comprises a plurality of fields for storing information parsed from the e-mail message. As shown in FIG. 9, record 910 comprises a first field 920 for storing a sender identification, a second field 922 for storing a package identification, a third field 924 for storing a projected delivery date, an optional fourth field 926 for storing an addressee identification, and a fifth field 928 for storing a delivery authorization status. The delivery authorization status field stores an indication that delivery is acceptable or an indication that delivery is not acceptable. With such a data table, package information can be compared against records to determine a delivery authorization status. Processor 122, after determining a matching record, reads the authorization status field of the matching record. In this manner, both a sender and an addressee send an e-mail that, in combination, create a delivery authorization status that delivery is acceptable.

Figure 10:
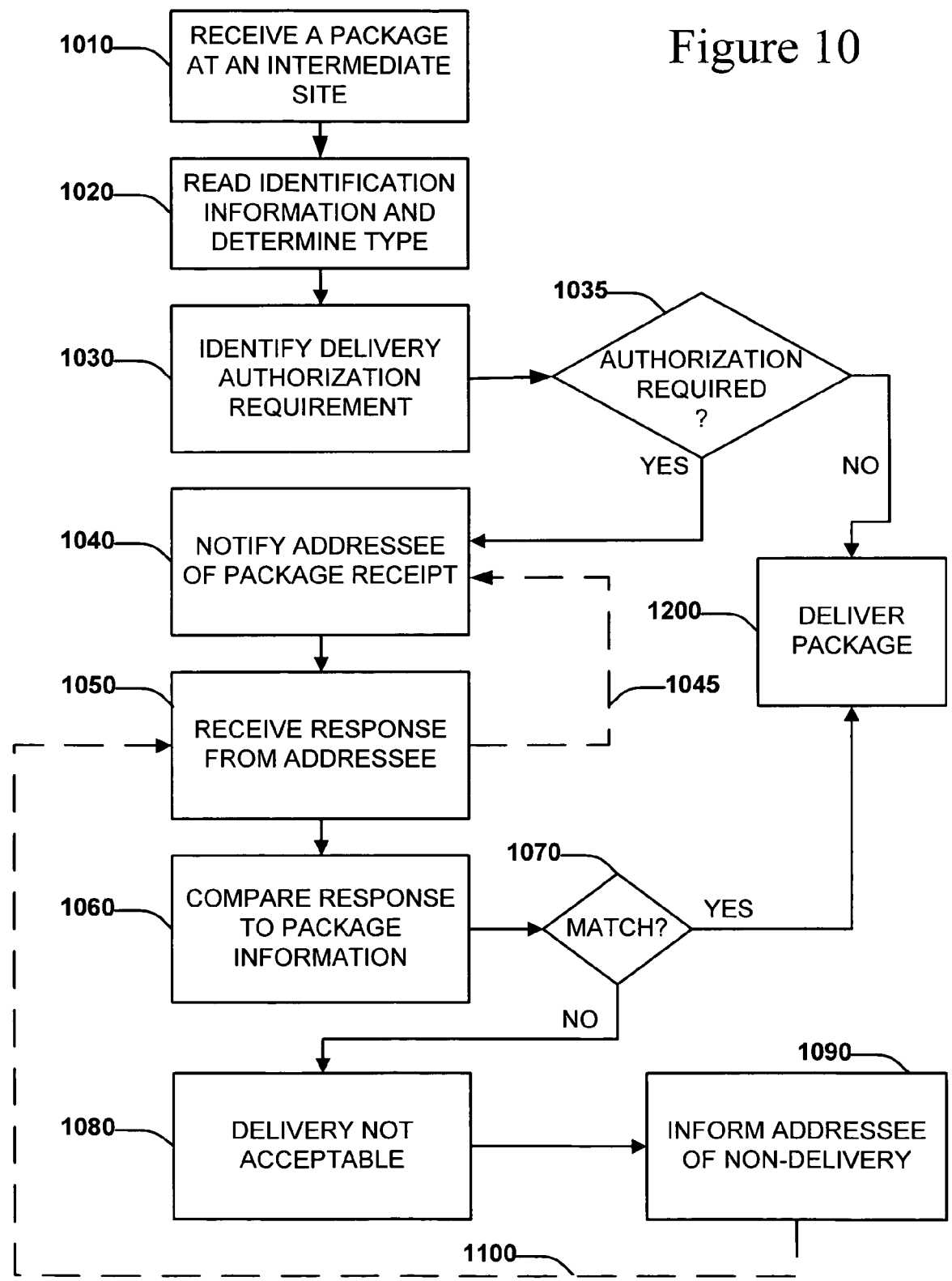
FIG. 10 is a flow diagram of another illustrative method for processing packages.

FIG. 10 is a flow diagram depicting another method for processing packages according to an exemplary embodiment. The method includes receiving a package at an intermediate site at step 1010. The package is equipped with information concerning the package. The package information may be represented on a label or may be contained in a radio frequency identification tag (RF tag) readable by an RF tag reader. The RF tag and RF tag reader may be implemented using technology known to those of skill in the art. The package information may contain such information as weight, value, size, quantify, sender identity, recipient identity, contents, mailing date and approximate delivery date. Equipment at the intermediate site reads the package information at step 1020. The package information is processed at step 1030 to determine if the package requires an authorization to be delivered.

In one embodiment, the processing involves analyzing at least one of the package information parameters and comparing the parameters to a threshold level. The threshold level can be set by any one or more of the sender, the carrier (e.g., the shipper), or the receiver of the package. For example, the sender may a desire to have all packages of a certain value require a delivery authorization such that the package is delivered to the correct addressee. Accordingly, the sender may set a threshold level for package value such that all packages valued over the threshold amount require delivery authorization. Alternately, the carrier may desire to have a delivery authorization requirement for all packages over a threshold weight. Accordingly, the carrier may set a threshold level of weight such that all packages over a certain weight require delivery authorization. Alternately, the addressee may desire to have a delivery authorization for all packages over a threshold size. Accordingly, the addressee may set a threshold level of size such that all packages over a certain size require delivery authorization. These thresholds may be communicated to the intermediate site in advance of the package arrival at the site, or the threshold may include a default parameter that the intermediate site uses to set delivery authorizations for some or all of its delivery customers.

Once the package information is compared against the threshold, a delivery authorization requirement determination may be used at step 1035 to determine if delivery is immediate at step 1200 or must await an authorization. If a delivery authorization is required, the addressee is notified of receipt of the package via an electronic message at step 1040. The electronic message may be any form of electronic message including such forms as an e-mail, a text message on a cell phone or PDA, or another form of electronically generated message to the addressee. Once the potential recipient/addressee is alerted as to the request for a delivery authorization, the addressee sends a response and the intermediate site receives the response at step 1050. In one embodiment, the addressee may optionally request additional information at step 1045 so that the addressee can provide a more suitable response.

According to an exemplary embodiment, the addressee response may be an electronic message and include an acknowledgement that the package is authorized for delivery to the addressee. The information in the response may include at lease some of the information identifying the package. In one embodiment, sender information regarding the package in the response electronic message may be compared to a list of approved senders and delivery authorization may be made. Other information may include a digital picture of the sender, the contents or the package, digital signature or other identifier corresponding to the package. The response information is then compared at step 1060 to the information obtained from the package at step 1020 to determine if a match exists between the two sets of information at step 1070.

If a match exists, then the package is delivered at step 1200. If there is a mismatch of identifying information then delivery of the package is not authorized and delivery is not acceptable as in step 1080. If the package is not authorized for delivery, an electronic message is optionally sent back to the addressee that delivery will not be made in step 1090. This action gives the addressee an opportunity to repair the content of the electronic message response at 100 and attempt to establish a delivery authorization. If delivery authorization does fail as in step 1080, then the package may be sent back to the sender.

Thus the invention provides a system and method for increasing the security of package delivery by receiving and storing delivery authorization statuses and determining a delivery authorization status corresponding to a package before delivering the package to the package addressee.

Executable instructions for implementing aspects of the invention may be embodied in the form of program code (i.e., instructions) stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. The invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

It is noted that the foregoing has been provided merely for the purpose of explanation and are in no way to be construed as limiting of the invention. While the invention has been described with reference to illustrative embodiments, it is understood that the words which have been used herein are words of description and illustration, rather than words of limitation. Further, although the invention has been described herein with reference to particular structure, methods, materials, and embodiments, the invention is not intended to be limited to the particulars disclosed herein; rather, the invention extends to all structures, methods and uses that are within the scope of the appended claims. Those skilled in the art, having the benefit of the teachings of this specification, may effect numerous modifications thereto and changes may be made without departing from the scope and spirit of the invention, as defined by the appended claims.

What is claimed:

1. A method for processing packages by a package carrier, the method comprising: receiving a package having associated received package information at an intermediate site; identifying the received package as requiring delivery authorization; notifying an addressee of receipt of the package using a first electronic message; receiving at the package carrier a second electronic message from the addressee comprising expected package information; comparing the received package information to the expected package information; and designating the package for delivery if the received package information matches the expected package information, wherein comparing the received package information to the expected package information and designating the package for delivery if the received package information matches the expected package information are electronically performed by the package carrier.

2. The method of claim 1, wherein receiving a package having associated received package information comprises receiving a package having a radio frequency identification mechanism containing received package information.

3. The method of claim 2, wherein the received package information comprises at least one of weight, size, quantity, sender identity, recipient identity, contents, mailing date and approximate delivery date.

4. The method of claim 1, wherein identifying the received package as requiring delivery authorization comprises analyzing at least one parameter of weight, value, size, quantity, sender identity, recipient identity, contents mailing date and approximate delivery date and comparing the at least one parameter with at least one threshold level to determine that the received package requires delivery authorization.

5. The method of claim 1, wherein notifying an addressee of receipt of the package using a first electronic message further comprises requesting confirmation of at least one of the expected package information and a confirmation of received package information.

6. The method of claim 1, wherein receiving a second electronic message comprising expected package information comprises receiving an electronic message comprising at least one of weight, value, size, quantity, sender identity, recipient identity, contents, mailing date and approximate delivery date.

7. The method of claim 1, further comprising: designating the package for non-delivery if the received package information does not match the expected package information.

8. The method of claim 1, further comprising receiving from the addressee a request for additional information.

9. The method of claim 8, wherein the additional information comprises at least one of a digital picture of the sender, a digital picture of the package, a digital picture of the contents and a digital package identifier.

10. The method of claim 1, wherein designating the package for delivery if the received package information matches the expected package information comprises designating the package for delivery if sender identification in the received package information is one of a list of senders in the expected package information.

11. The method of claim 1, further comprising receiving at the package carrier a third electronic message from a sender of the package, the third electronic message including the received package information.

12. The method of claim 1, wherein identifying the received package as requiring delivery authorization comprises applying a threshold set by the sender of the package.

13. A computer-readable storage medium having computer-executable instructions for performing a method for processing packages, the computer readable storage medium comprising: computer-executable instructions for receiving a package having associated received package information at an intermediate site; computer-executable instructions for identifying the received package as requiring delivery authorization; computer-executable instructions for notifying an addressee of receipt of the package using a first electronic message; computer-executable instructions for receiving a second electronic message from the addressee comprising expected package information; computer-executable instructions for comparing the received package information to the expected package information; and computer-executable instructions for designating the package for delivery if the received package information matches the expected package information.

14. The computer-readable storage medium of claim 13, wherein the computer-executable instructions for receiving a package having associated received package information comprises computer-executable instructions for receiving a package having a radio frequency identification mechanism containing received package information.

15. The computer-readable storage medium of claim 14, wherein the received package information comprises at least one of weight, size, quantity, sender identity, recipient identity, contents, mailing date and approximate delivery date.

16. The computer-readable storage medium of claim 13, wherein the computer-executable instructions for identifying the received package as requiring delivery authorization comprises computer-executable instructions for analyzing at least one parameter of weight, value, size, quantity, sender identity, recipient identity, contents mailing date and approximate delivery date and computer-executable instructions for comparing the at least one parameter with at least one threshold level to determine that the received package requires delivery authorization.

17. The computer-readable storage medium of claim 13, wherein the computer-executable instructions for notifying an addressee of receipt of the package using a first electronic message further comprises computer-executable instructions for requesting confirmation of at least one of the expected package information and a confirmation of received package information.

18. The computer-readable storage medium of claim 13, wherein the computer-executable instructions for receiving a second electronic message comprising expected package information comprises computer-executable instructions for receiving an electronic message comprising at least one of weight, value, size, quantity, sender identity, recipient identity, contents, mailing date and approximate delivery date.

19. The computer-readable storage medium of claim 13, further comprising: computer-executable instructions for designating the package for non-delivery if the received package information does not match the expected package information.

20. The computer-readable storage medium of claim 13, wherein the further comprising computer-executable instructions for receiving from the addressee a request for additional information.

* * * * *